United States Patent
Castelli et al.

(10) Patent No.: US 8,291,243 B2
(45) Date of Patent: Oct. 16, 2012

(54) ADAPTIVE COMPUTING RESPONSIVE TO ENVIRONMENTAL CONDITIONS

(75) Inventors: Vittorio Castelli, Croton on Hudson, NY (US); Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 12/257,627

(22) Filed: Oct. 24, 2008

(65) Prior Publication Data

US 2010/0106982 A1    Apr. 29, 2010

(51) Int. Cl.
*G06F 1/00* (2006.01)
*G06F 1/26* (2006.01)
*G06F 1/32* (2006.01)

(52) U.S. Cl. ......... 713/320; 713/323; 713/324; 713/340
(58) Field of Classification Search .................. 713/320, 713/323, 324, 340
See application file for complete search history.

(56) References Cited

U.S. PATENT DOCUMENTS

| | | | |
|---|---|---|---|
| 6,785,592 B1 | 8/2004 | Smith et al. | |
| 6,859,882 B2 * | 2/2005 | Fung | 713/300 |
| 7,171,287 B2 * | 1/2007 | Weiss | 700/291 |
| 7,349,828 B1 * | 3/2008 | Ranganathan et al. | 702/186 |
| 7,353,413 B2 * | 4/2008 | Dunstan | 713/320 |
| 7,533,283 B2 * | 5/2009 | Fung | 713/322 |
| 2008/0077355 A1 | 3/2008 | Casler et al. | |

* cited by examiner

*Primary Examiner* — Mark Rinehart
*Assistant Examiner* — Jeremy S Cerullo
(74) *Attorney, Agent, or Firm* — Patrick J. Daugherty; Driggs, Hogg, Daugherty & Del Zoppo Co., LPA

(57) ABSTRACT

Methods, including service methods, articles of manufacture, systems, articles and programmable devices are provided for adapting the power consumption of a computational device in response to environmental conditions. Operating environmental condition data relevant to the generation of electric power is acquired from an operating environment feed and analyzed to determine a high electric power demand indication. If the analyzing determines a high electric power demand indication, then a computational device automatically reduces an amount of electric power consumption.

20 Claims, 3 Drawing Sheets

ADAPTIVE COMPUTING RESPONSIVE TO ENVIRONMENTAL CONDITIONS

FIELD OF THE INVENTION

The present invention generally describes methods, systems, program products and devices for adapting the power consumption of a computational device in response to environmental conditions.

BACKGROUND OF THE INVENTION

Green computing has been defined as the study and practice of using computing resources efficiently. Typically, technological systems or computing products that incorporate green computing principles take into account economic viability, social responsibility and environmental impact. In particular, green computing includes efforts to obtain maximized energy efficiency from the computer resources being used. Green computing is also described as the science behind efficient computing and performing tasks on a smaller power budget. All computer usage consumes energy, and depending on the energy source, such usage may also increase greenhouse gas emissions. The United States Government, as well as the information technology industry, recognizes the importance of efficient computing in order to reduce greenhouse gas emissions resulting from energy or power consumption. Large government and commercial initiatives are underway to identify environmentally conscious information technology programs and the most efficient computers.

Computer systems may impose a large burden on a power grid, and some estimate that the energy cost to run a large computer system may exceed the cost of the system hardware over its useful life. Energy is consumed by the system computational components, as well as to cool the environment and to provide illumination for operators. To reduce energy usage, manufacturers have developed numerous power-efficient technologies: for example, processor speeds and/or use can be adaptively reduced or stopped when the processor is not heavily used, monitors and peripherals can be put in a reduced power-consumption mode, etc. However, such mechanisms are configured to operate only on a localized level, in response to local considerations, for example manually triggered by a conscientious (or utility bill-paying) user or automatically by a hardware configuration or a software application running on the system (e.g., triggering a standby state after a given idle time, or in response to a heat monitor detecting a rise in an internal temperature associated with a powered computer component). Total energy or environmental savings realized by such processes may be nullified or insignificant when considered on an overall (e.g. annual) basis when energy used by the device in more-active or higher-powered uses is acquired during peak energy demand times, thus utilizing the highest-cost or most environmentally-degrading energy available to the device.

SUMMARY OF THE INVENTION

Methods are provided for adapting the power consumption of a computational device in response to environmental conditions. Operating environmental condition data relevant to the generation of electric power is acquired from an operating environment feed and analyzed to determine a high electric power demand indication. If the analyzing determines a high electric power demand indication, then a computational device automatically reduces an amount of electric power consumption.

Service methods are also provided comprising deploying applications for adapting the power consumption of a computational device in response to environmental conditions according to the method steps described above, for example by a service provider who offers to implement, deploy, and/or perform functions for others. Still further, articles of manufacture comprising a computer usable medium having a computer readable program in said medium are provided. Such program code comprises instructions which, when executed on a computer system, cause the computer system to perform one or more method and/or process elements described above for adapting the power consumption of a computational device in response to environmental conditions. Moreover, systems, articles and programmable devices are also provided configured for performing one or more method and/or process elements of the current invention for adapting the power consumption of a computational device in response to environmental conditions, for example as described above.

BRIEF DESCRIPTION OF THE DRAWINGS

These and other features of the methods, systems and devices for carbon offsetting will be more readily understood from the following detailed description of the various aspects of the embodiments taken in conjunction with the accompanying drawings in which.

Figure 1:
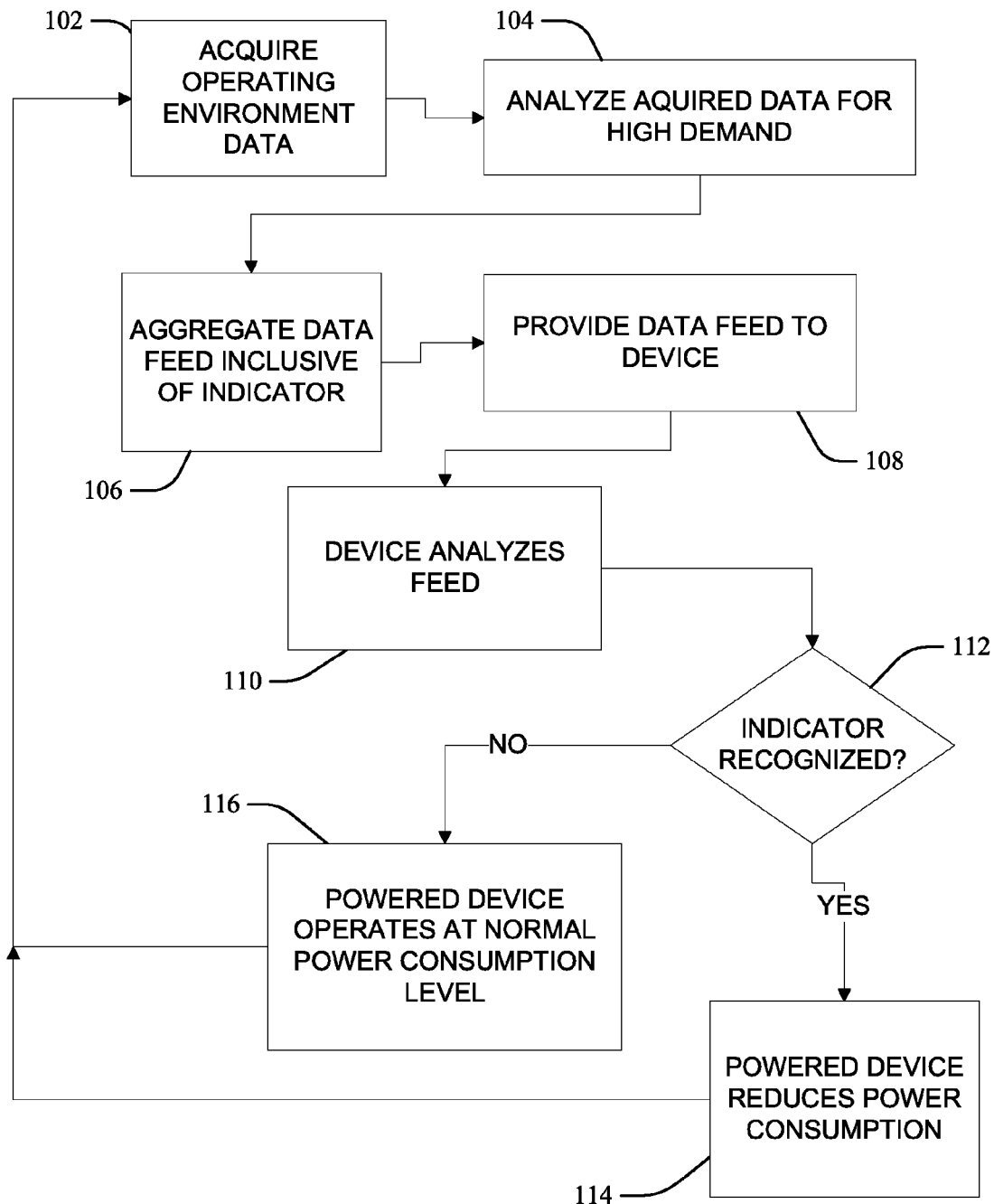
FIG. 1 is a flow chart illustrating a method and system for configuring the power consumption of a computational device in response to environmental conditions according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
I. General Description; and
II. Computerized Implementation

I. General Description

The present invention teaches methods, systems and apparatuses for adapting the power consumption of a computer system to environmental conditions, including local and global demands on a power grid, by monitoring environmental conditions and appropriately adjusting the power demand of the computer system and/or of a physical infrastructure that houses the computer system. More particularly, FIG. 1 illustrates an example of a method or system according to the present invention for configuring the power consumption of a computational device in response to environmental conditions. At 102 operating environmental condition data relevant to the generation of electric power is acquired, the acquired data analyzed at 104 to determine whether a high demand for electric power is indicated by the data. At 106 the analyzed data is aggregated into a data feed configured for receipt and analysis by a computational device, wherein the data feed includes a high-demand indicator if the analysis at 104 determines a high-demand condition for electric power is indicated.

At 108 the data feed is provided to a computational device, which processes the data feed at 110, the processing including recognizing any high-demand indicator present within the data feed. At 112 a power consumption attribute of the computational device is set or selected in response to the data feed, and more particularly to the presence or absence of a high-demand indicator within the data feed: if the indicator is present at 112 then the computational device automatically reduces an amount of electric power consumption in response at 114; else, if the indicator is absent at 112 then the computational device operates at a normal power or other consumption level responsively at 116, one relatively higher than the reduced power consumption level invoked at 114. In some examples selecting the normal/higher power level at 116 includes automatically increasing a present amount of electric power consumption in response to recognizing that the high electric power demand indicator is not present in a processed data feed, for example increasing a power consumption level previously reduced in response to a previous data feed which included a high-demand indicator. The process then loops back to acquiring operating environmental condition data at 102 for subsequent data feed generation and responsive power consumption setting by the computational device, in some embodiments on a repetitive or iterative basis.

It is known for electrical power supplied to computing environments to be produced by a coalition of providers that operate power plants and distribute power through a grid. Needed power may generally be transferred freely between providers within a grid, and it is also common for a plurality of different grids to transfer power from gird-to-grid, though limitations may be imposed upon the amounts of power transferred gird-to-grid. Though excess power may thus be transferred from one provider or grid to another, excess electric power cannot generally be easily stored.

To meet power demand different types of power plants generally contribute as needed to a given power grid. Relatively large and more efficient power plants, such as nuclear power plants and large fossil-fuel power plants, typically work at or near capacity all the time in supplying a given grid; such large plants are generally more efficient and cleaner sources of power than smaller options, and may not be easily shut down and restarted, and therefore are not generally suitable to meet demand peaks but are instead utilized to meet base power needs. Medium sized power plants may also be used in a grid system to provide part of the bulk of the energy provided, and may also be useful in temporally increasing grid power supplies to compensate for predictable, medium-term variation in power demands as they may be started-up and brought on-line in a reasonable amount of time and with a reasonable efficiency in resources and environmental effects. Smaller power plants, such as hydroelectric plants and small size fossil fuel plants, can be brought on-line quickly, and are often used to meet peak power demand. However, smaller fossil fuel power plants are typically much more inefficient and less clean than larger power plants, and energy produced by smaller power plants is often sold through an auction-style process (sometimes known as the "Spot market"), which may result in energy costs a couple of orders of magnitude more expensive than the energy produced by larger power plants.

Computer systems may impose a large burden on a power grid, and some estimate that the energy cost to run a large computer system may exceed the cost of the system hardware over its useful life. Energy is consumed by the system computational components, as well as to cool the environment and to provide illumination for operators. To reduce energy usage, manufacturers have developed numerous power-efficient technologies: for example, processor speed can be adaptively reduced when the processor is not heavily used, monitors and peripherals can be put in a reduced power-consumption mode, etc. However, such mechanisms are configured to operate only on a localized level, either manually triggered by a conscientious (or utility bill-paying) user, or by an application running on the system responsive only to local system parameters (e.g., triggering a standby state after a given idle time), and thus however effective these technologies are limited in responsiveness to larger contextual conditions: no consideration is given to the present cost of power used, or to the sources of that power.

The present invention teaches methods and apparatuses for implementing green-computing management policies to enable computational devices to automatically adjust their power usage in response to operating and environmental conditions associated with energy production and provision, in one aspect minimizing an impact of a computer system on energy demand within a grid or energy provider system or network. For example, reducing demand on a power grid during a period of high demand reduces the need to bring on-line or utilize inefficient and/or expensive smaller power plants, thereby reducing pollution and lowering the cost of energy.

According to the present invention a service provider or other entity or component may acquire data (for example at 102 of FIG. 1 above) in a standard data format (e.g. Extensible Markup Language, or XML) supplied via a Really Simple Syndication (RSS) feed from electricity plants, weather services, and other information providers to ascertain present power and environmental conditions. Such information providers (power plants, weather services, etc) need not continuously stream information to a service provider, and may instead update XML files using standard RSS notations. The service provider publishes or pushes an aggregated data feed (for example at 108 of FIG. 1 above), including aggregating feeds or data from any individual service providers, to a computational device, wherein one or more components within the receiving computational device are configured to await instructions to cause an element in the computational device to enter a power-reduction mode in response to an indicator within the aggregate feed.

Examples of feeds, information and data appropriate to function as environmental data inputs (for example at 102 of FIG. 1 above) or as power-setting indicators (for example at 108 of FIG. 1 above) include a spot price of electricity, a rate of change of price of electricity, weather conditions, time of day, a facility (e.g. a household, building or company) energy use, census data associated with a specified energy use or demand, as well as other data relevant to energy costs. In another aspect the present invention may simultaneously and efficiently cascade power consumption reduction indicators or other data to a plurality of individual computers, server farms or computer systems, on a massive or even a global scale.

Figure 2:
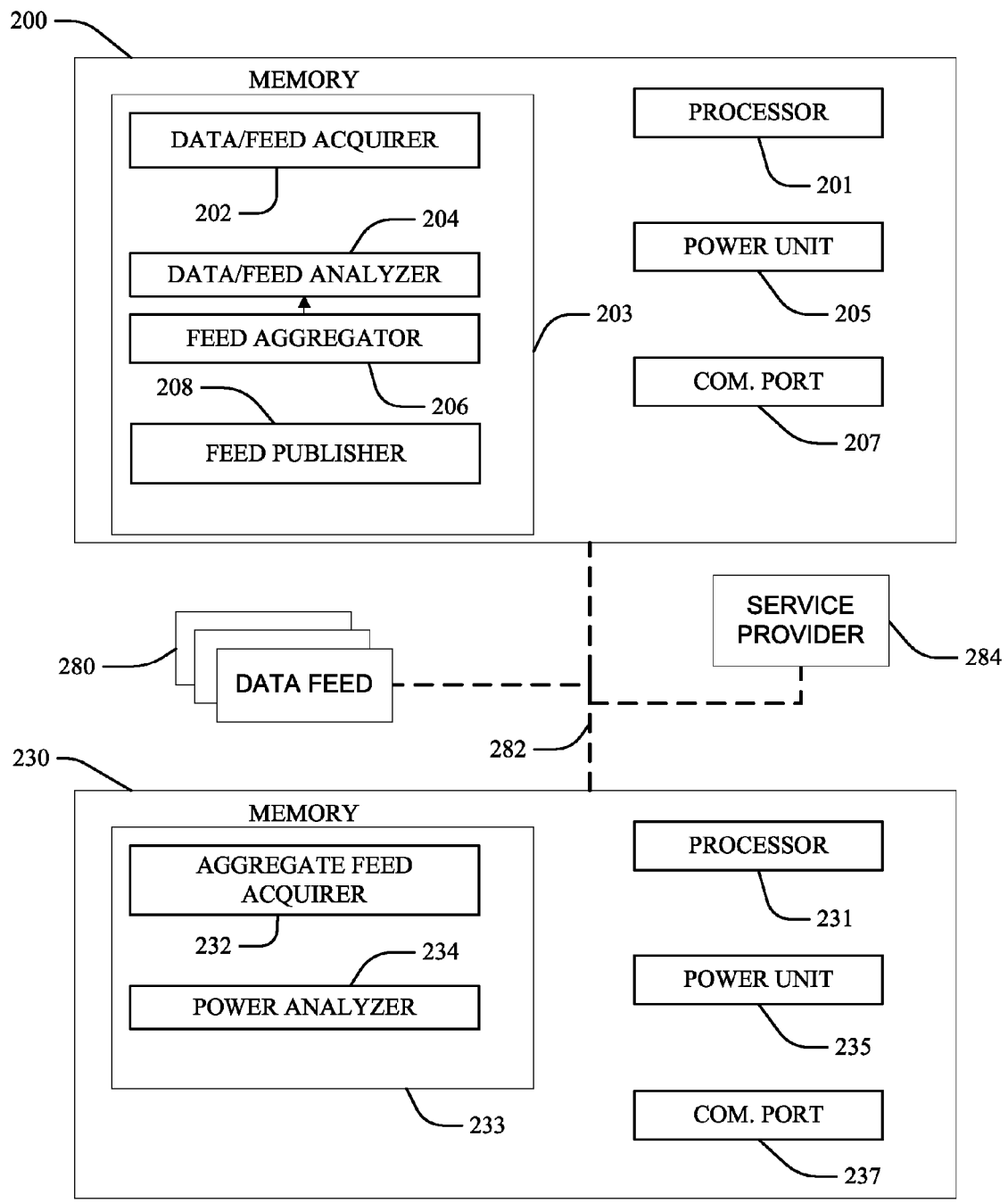
FIG. 2 is a block diagram of a programmable device configured to set the power consumption of a computational device in response to environmental conditions according to the present invention.

FIG. 2 illustrates an example on one embodiment of a programmable device or module 200 and computational device 230 according to the present invention, for example as discussed above with respect to FIG. 1. The module 200 is configured to acquire feeds or other power-generating contextual, environmental or operating information and data from one or more feed/data providers 280, the module 200 further configured to aggregate a feed inclusive of high-demand indicators and publish the aggregate feed through a communication means 282 to the computational device 230, which may responsively select a power-reduced or relatively higher powered configuration as discussed above. The module 200 and computational device 230 may each be incorporated into a larger system wherein other components of the system accomplish systems and methods according to the present invention, or they may be stand-alone structures configured to perform each of the processes and methods of the present invention. The present module 200 and computational device 230 embodiments each comprise respective central processing unit (CPU) or other processing means 201/231 in communication with memories 203/233, the memories 203/233 comprising logic components that enable the CPU's 201/231 to perform processes and methods according to the present application.

Power units 205/235 are configured to provide operative power respectively to the module 200 and computational device 230; examples include batteries and power components configured to receive alternating or direct current electrical power, and other appropriate power units 205/235 will be apparent to one skilled in the art. Communication ports or network link/nodes 207/237 are also provided and configured to enable network and other communications with the respective other of the module 200 and computational device 230, as well as with users; other devices; systems; and with monitoring, administrative and service provider entities, as well as other appropriate entities and structures.

More particularly, the memory 203 of the programmable module 200 comprises a data/feed acquirer logic component 202 configured to acquire information from a plurality of feed and/or sources 280. Information data and files received through the feed 280 may be updated regularly, for example by a timer on a provider side or updates driven by changes in data, and the data acquisition component 202 may be configured to regularly check feed files for changes, and if changes are found or occur then download the changed data, update internal state tables with the new downloaded data, then invoke a data/feed analyzer component 204 (described more fully below).

RSS generally refers to a family of internet web feed formats used to publish frequently updated content, and in the present invention feed data acquired may include energy prices or current energy use in a company. Thus an RSS energy feed or energy document acquired may contain a summary of energy information from an associated energy feed provider or other detailed information. RSS feed embodiments and configurations enable a data acquisition entity (e.g. the programmable module 200 or a service provider) to automatically track energy information providers deemed of importance (or that a customer deems of importance) selected from a larger universe of information providers.

The feeds 280 may comprise a variety of feeds and sources. An energy producer feed 280 appropriate for acquisition and analysis may contain information describing the output capacity and current output of potential energy producers. Thus analysis of an energy producer feed 280 may indicate that one or more local, more environmentally-friendly (or "green") energy producers are near capacity, resulting in issuance of a high-demand indicator through an aggregate feed through the communication means 282 to the computation device 230 thereby triggering a reduction in computer power consumption to avoid the need to obtain energy from less green producers, such as those plants that come online when the more efficient, larger power plants reach capacity.

Weather feeds 280 may provide data or information describing weather conditions. If weather conditions are unusual they may result in heavy demand on the power infrastructure which may trigger computer power consumption reduction according to the present invention. Household, building or company-use feeds 280 may also be considered: for example, if a building or company is utilizing excessive power units, it may be advantageous for computers to enter a power consumption reduction mode. Spot price feeds 280 may contain an indication of an expected demand on a power infrastructure for a subsequent future time period (e.g. for the following day): in response a high-demand indicator may cause the computational device 230 to trigger immediate power savings operations as well as postpone or otherwise schedule power-consuming activities as a function of preferential spot prices, for example running nonessential services only when a spot price is low (and therefore when green energy is likely to be available).

Accordingly, the memory 203 also comprises a data/feed analyzer logic component 204 configured to determine high-demand energy conditions (for example at 104 of FIG. 1 above) from the feeds/data acquired; and which in some embodiments may also weight each of a plurality of different feed sources 280, in some examples according to an algorithm or other function. In one example a data/feed analyzer logic component 204 is configured with a weighted function comprising a linear combination of values obtained from a plurality of different sources or feeds 280 with appropriate weights, wherein if the linear combination is above a certain threshold power savings according to the present invention is triggered or ended. Weights and thresholds may be determined through machine learning techniques, for example as a function of historical data from feeds 280 over given time periods and with respect to corresponding data on the "greenness" of power produced during those time periods, with coefficients of linear combinations and threshold learned by processing said information. Some embodiments may consider functions embedded in statistical classifiers, where the actual form of a function is known only implicitly and is computed automatically by a learning algorithm based on historical data; moreover, statistical classifiers are not limited to linear functions, as will be appreciated by one skilled in the art.

After analysis a feed aggregator logic component 206 within the memory 203 aggregates data from various providers 280 to create a single feed containing acquired data from all of the sources 280 (for example at 106 of FIG. 1 above). The feed aggregator 206 may create a new RSS feed to contain this information, and may also categorize information from each provider 280. Categories may include "Energy Source" for information from the power providers, "Environmental" for information about weather, "Utilization" for information about building or company usage, etc. Such feed aggregation enables the computational device 230 to access information from a single source (e.g. the module 200) and in single format configured for use and consumption by a given computational device 230.

Aggregated feed publication to the computational device (for example at 108 of FIG. 1 above) is accomplished by a feed publisher logic component 208, which may publish the aggregate feed through pushing updated RSS data to registered computational devices 230, or by providing a method for the computational devices 230 to pull updated data from the feed publisher 208 or other service provider. In a push method example the feed publisher 208 maintains a list of devices and instructions, such as an IP address, of where to transmit data when an update occurs. In a pull method example the feed publisher 208 places data in a known location, with another provider or the computational device 230 periodically checking for updates, for example through Hypertext Transfer Protocol (HTTP) requests over Transmission Control Protocol/Internet Protocol (TCP/IP).

The computational device 230 memory 233 comprises an aggregate feed acquirer logic component 232 configured to acquire the aggregated feed from the feed publisher 208 through the communication means 282 through using the push and/or pull mechanisms described above. In a push embodiment the aggregate feed acquirer 232 awaits data updates from the feed publisher 208, for example listening for incoming data through a socket communication means 282. The aggregate feed acquirer 232 may thus accept incoming data, potentially after an authorization step, and update internal state tables to reflect the newly acquired data. In a pull embodiment the aggregate feed acquirer 232 periodically checks for updates in a known location referenced by the feed publisher 208 on the module 200 (e.g. a location within the memory 203) or upon another location or service provider 284, for example using HTTP requests over TCP/IP. In one example a service provider 284 listens for incoming HTTP requests and transmits data in an HTTP response, the response then received by the aggregate feed acquirer 232. The computational device 230 memory 233 further comprises a power analyzer logic component 234 configured to parse the aggregate feed and to update internal state tables with the parsed data to reflect newly acquired data. In some embodiments the power analyzer 234 analyzes obtained feed data using an algorithm that invokes methods to reduce power consumption on the computational device 230.

Moreover, it should be noted that in other embodiments one or both of the data/feed acquirer logic component 202 and the data/feed analyzer logic component 204 may be instead located directly within the computational device 230 memory 233: more particularly, the computational device 230 may thus be configured to directly acquire feeds/data from the sources 280 and perform the functions described above according to the present invention. Additionally, in some embodiments a service provider 284 performs the required feed 280 analysis and aggregate results into an aggregate feed with indicators published to the computational device 230 according to the present invention. Further, the computational device 230 may also omit the power analyzer logic component 234 and/or associated algorithm processes, wherein the aggregate feed acquirer 232 may instead be configured to perform a power consumption level selection process according to the present invention.

In some embodiments the power analyzer 234 or the service provider 284 apply an algorithm comprising: obtaining feed data, for example from feed publisher 208 as described above; the obtained feed data is used as an input to a weighting function, which consequently produces a value; the value is compared to a threshold which denotes a high-consumption of non-green energy in a supplying power grid; and if the value exceeds the threshold, the computer system performs one or more actions to reduce power consumption.

II. Computerized Implementation

Figure 3:
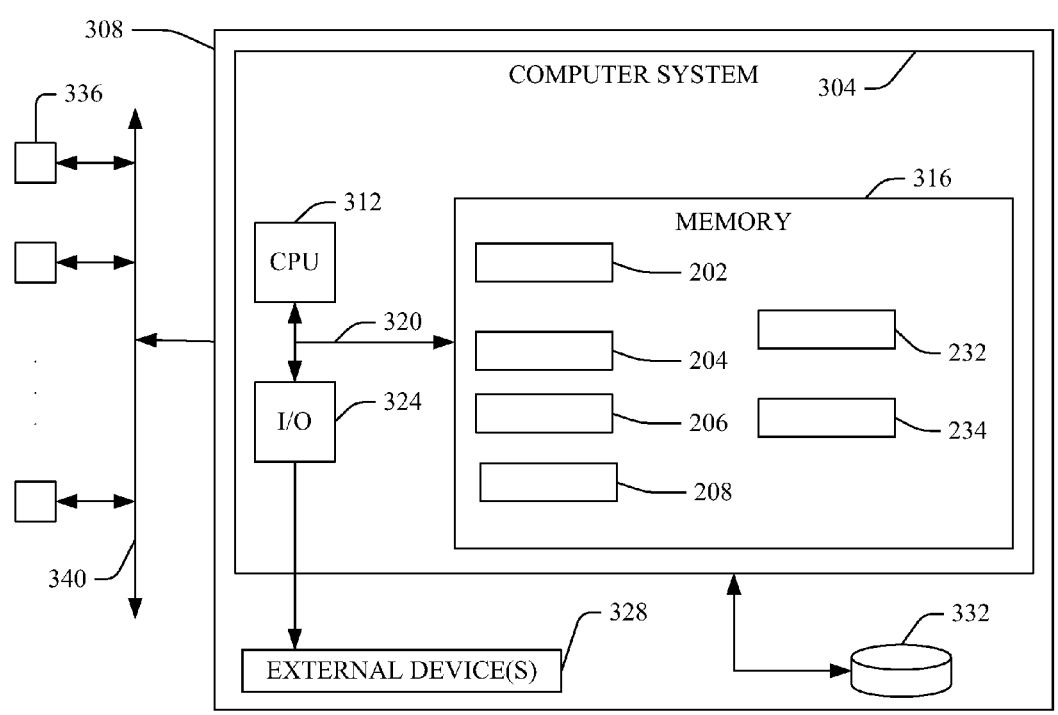
FIG. 3 is a block diagram illustrating a computerized implementation of a process for configuring the power consumption of a computational device in response to environmental conditions according to the present invention.

Referring now to FIG. 3, an exemplary computerized implementation of a process for adapting the power consumption of a computational device in response to environmental conditions according to the present invention is provided, including a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and systems, and devices as illustrated in FIGS. 1-2 and described above, and in the present example the memory 316 includes the data/feed acquirer logic component 202, the data/feed analyzer component 204, the feed aggregator logic component 206, the feed publisher logic component 208, the aggregate feed acquirer logic component 232, and the power analyzer logic component 234. It is to be appreciated that two or more, including all, of these components may be implemented as a single component and that some components may be omitted (e.g. where processes are instead provided by a service provider).

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

Examples of power reduction actions taken by the power analyzer 234 within the computerized implementation of FIG. 3 include: reducing a clock rate of the CPU 312; reducing a brightness of a monitor 328 of the computer system 304; reducing a waiting time before disks 316/332 of the computer system 304 are suspended; reducing a waiting time before the computer system 304 enters a hibernation or a standby mode; turning off one or more banks of memory 316/332 of the computer system 304; disabling one or more applications providing nonessential services (e.g., turning off the services that check for availability of software upgrades, turning off grid applications, etc.); consolidating loads from one or more computational devices 336 onto the single computer system 304 and turning off the other computational devices 336; scheduling nonessential operations at a different time (e.g., nonessential software or hardware upgrades); and still other appropriate examples will be apparent to one skilled in the art. It should also be noted that the algorithm described may be substantially more complex, for example extended to have multiple thresholds that progressively trigger additional power saving actions.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/usable medium that includes computer program code to enable a computer infrastructure to implement methods, systems and devices according to the present application, for example as illustrated in FIGS. 1 and 2 above and described otherwise herein. To this extent, the computer-readable/usable medium includes program code that implements each of the various process steps of the present application.

It is understood that the terms computer-readable medium or computer usable medium comprise one or more of any type of physical embodiment of the program code. In particular, the computer-readable/usable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network (e.g., during a wired/wireless electronic distribution of the program code).

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment the invention may comprise a business method that performs the process steps of the invention on a subscription, advertising, and/or fee basis. Thus a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for adapting the power consumption of a computational device in response to environmental conditions, comprising:

acquiring operating environmental condition data relevant to the generation of electric power in a power grid system from an operating environment feed input;

analyzing the operating environmental condition data to determine an indication of a high demand for electric power from the power grid system; and a computational device automatically reducing a current amount of consumption of electric power from the power grid system by the computational device if the analyzing determines the high electric power demand indication.

2. The method of claim 1,
wherein the analyzing the operating environmental condition data determines the indication of the high demand for electric power from the power grid system if the operating environmental condition data indicates that a small size fossil fuel plant is coming on-line to provide power to the power grid system in response to a power demand on the power grid system.

3. The method of claim 1, further comprising the computational device automatically increasing the current amount of consumption of electric power from the power grid system by the computational device from a current reduced electric power consumption level in response to not determining the indication of the high demand for electric power from the power grid system by analyzing the operating environmental condition data.

4. The method of claim 1, wherein the operating environment feed is a really simple syndication feed from at least one of an electricity plant and a weather service.

5. The method of claim 1,
wherein the analyzing the operating environmental condition data determines indication of the high demand for electric power if the operating environmental condition data indicates an unusual weather condition that may result in heavy demand for power from the power grid system.

6. The method of claim 3, further comprising:
regularly updating the acquired the operating environmental condition data;
if changes are found in the updated environmental condition data, updating an internal state table with new downloaded data from the operating environment feed input; and
automatically reducing a present amount of consumption of electric power from the power grid system by the computational device if analyzing the updated state table data determines a high electric power demand indication, or increasing the present amount of consumption of electric power from the power grid system by the computational device if analyzing the updated state table data does not determine a high electric power demand indication.

7. The method of claim 1, wherein the operating environmental condition data feed comprises information describing an output capacity and a current output of each of plurality of potential energy producers of the power grid system; and
wherein the analyzing the operating environmental condition data determines the indication of the high demand for electric power from the power grid system if the operating environmental condition data feed information indicates a relatively environmentally-friendly energy producer is near its output capacity.

8. The method of claim 1 wherein the analyzing the operating environment feed data to determine a high electric power demand indication comprises:
applying a weighted function comprising a linear combination of values obtained from a plurality of different feeds, each of the different feeds having a weight; and
if the linear combination is above a certain threshold, including the high demand indicator in the aggregate feed.

9. The method of claim 1, further comprising determining the indication of the high demand for electric power from the power grid system in response to data in the operating environmental condition data that comprises at least one of:
a spot price value of electricity; and
a rate of change of a price of electricity.

10. The method of claim 9 wherein the step of the computational device automatically reducing the current amount of consumption of electric power from the power grid system by the computational device comprises running nonessential services only when the spot price value of electricity is low.

11. A service for adapting the power consumption of a computational device in response to environmental conditions, comprising:
providing a computer infrastructure configured to:
acquire operating environmental condition data relevant to the generation of electric power in a power grid system from an operating environment feed input;
analyze the operating environmental condition data to determine an indication of a high demand for electric power from the power grid system; and
cause a computational device to automatically reduce a current amount of consumption of electric power from the power grid system by the computational device if the analyzing determines the high electric power demand indication.

12. The service of claim 11, wherein the computer infrastructure is further configured to:
determine the indication of the high demand for electric power from the power grid system if the operating environmental condition data indicates that a small size fossil fuel plant is coming on-line to provide power to the power grid system in response to a power demand on the power grid system.

13. The service of claim 12, wherein the computer infrastructure is further configured to determine the indication of the high demand for electric power from the power grid system if the operating environmental condition data indicates an unusual weather condition that may result in heavy demand for power from the power grid system.

14. The service of claim 12, wherein the computer infrastructure is further configured to determine the high electric power demand indication in response to data in the operating environmental condition data that comprises at least one of:
a spot price value of electricity; and
a rate of change of a price of electricity.

15. An article of manufacture, comprising:
a computer readable tangible storage medium having computer readable program code embodied therewith, the computer readable program code comprising instructions which, when executed on a computer system, cause the computer system to:
acquire operating environmental condition data relevant to the generation of electric power in a power grid system from an operating environment feed input;
analyze the operating environmental condition data to determine an indication of a high demand for electric power from the power grid system; and
cause a computational device to automatically reduce a current amount of consumption of electric power from the power grid system by the computational device if the analyzing determines the high electric power demand indication.

16. The article of manufacture of claim 15, the program code comprising instructions which, when executed on the computer system, causes the computer system to:

regularly update the acquired the operating environmental condition data;

if changes are found in the updated environmental condition data, update an internal state table with new downloaded data from the operating environment feed input; and automatically reduce a present amount of consumption of electric power from the power grid system by the computational device if analyzing the updated state table data determines a high electric power demand indication.

17. The article of manufacture of claim 15, the program code comprising instructions which, when executed on the computer system, causes the computer system to analyze the operating environment feed data to determine the high electric power demand indication if the operating environmental condition data feed information indicates a relatively environmentally-friendly energy producer is near its output capacity.

18. A programmable device comprising:

a processing means;

a memory in communication with the processing means comprising a logic component; and a network interface in communication with the processing means and the memory;

wherein the processing means is configured to:

acquire operating environmental condition data relevant to the generation of electric power in a power grid system from an operating environment feed input;

analyze the operating environmental condition data to determine an indication of a high demand for electric power from the power grid system; and cause a computational device to automatically reduce a current amount of consumption of electric power from the power grid system by the computational device if the analyzing determines the high electric power demand indication.

19. The programmable device of claim 18, wherein processing means is configured to:

regularly update the acquired the operating environmental condition data;

if changes are found in the updated environmental condition data, update an internal state table with new downloaded data from the operating environment feed input; and automatically reduce a present amount of consumption of electric power from the power grid system by the computational device if analyzing the updated state table data determines a high electric power demand indication.

20. The programmable device of claim 18, wherein processing means is configured to analyze the operating environment feed data to determine a high electric power demand indication by:

determining the indication of the high demand for electric power if the operating environmental condition data indicates that a small size fossil fuel plant is coming on-line to provide power to the power grid system in response to a power demand on the power grid system.

* * * * *